United States Patent [19]

Backus et al.

[11] Patent Number: 5,324,185

[45] Date of Patent: Jun. 28, 1994

[54] PASTA, PASTRY, COOKIE, AND HORS D'OEUVRE MAKER

[75] Inventors: Alan L. Backus, Los Angeles; Ronald M. Popeil, Beverly Hills, both of Calif.

[73] Assignee: Popeil Pasta Products, Inc., Los Angeles, Calif.

[21] Appl. No.: 59,338

[22] Filed: May 11, 1993

[51] Int. Cl.⁵ .................. A21C 3/04; B29C 47/38
[52] U.S. Cl. .................. 425/72.1; 425/209; 425/311; 425/377; 425/404
[58] Field of Search ........... 425/203, 209, 311, 308, 425/464, 378.1, 315, 404, 403.1, 377, 205, 72.1; 426/516, 518, 503, 504; 366/79, 80, 90, 324

[56] References Cited

U.S. PATENT DOCUMENTS

| | | | |
|---|---|---|---|
| 4,078,874 | 3/1978 | Lenhardt, Sr. | 425/377 |
| 4,097,213 | 6/1978 | McComb et al. | 426/516 |
| 4,465,447 | 8/1984 | Cheigh et al. | 425/404 |
| 4,661,364 | 4/1987 | Campbell | 426/503 |

Primary Examiner—Khanh Nguyen
Attorney, Agent, or Firm—Keck, Mahin & Cate

[57] ABSTRACT

A device to mix and extrude various ingredients including pastas, pastries, baked goods, hors d'oeuvres, and cookies. The device includes novel measuring, mixing and extrusion assembly including: an automatic measuring cup; a subassembly to continuously mix and extrude ingredients without intervening cleanings; mixing and extrusion feed subassembly for handling different consistencies of ingredients; an integrated automatic cutter; motor cooling and extruded ingredient drying device; and various safety devices.

5 Claims, 6 Drawing Sheets

PASTA, PASTRY, COOKIE, AND HORS D'OEUVRE MAKER

BACKGROUND—FIELD OF INVENTION

The present invention is directed to home electric appliances to make pastas, pastries, cookies and hors d'oeuvres.

BACKGROUND—DESCRIPTION OF PRIOR ART

Home pasta making appliances which both mix dough and automatically extrude dough through a die have been around for many years. In general they have a configuration which comprises a mixing bin containing a plurality of rotating mixing blades and an extrusion auger screw which forces the mixed dough through an extrusion die. Most use trap doors to move the dough from the mixing bin to the extruder. A few lift the dough into the extruder using a feed blade attached to the mixer blade shaft.

For the most part, existing pasta machines have limited capacity, are messy and time consuming to use, and have limited versatility.

SUMMARY OF INVENTION

The present invention addresses these problems. It allows repeated loads to be made without requiring intervening cleaning thus addressing the limited capacity problem. It has an automatic measuring cup which is quick and clean to use, and it handles a wide variety of dough textures thus making it appropriate for many cooking applications besides pasta.

These and other objects and advantages will become more readily apparent from the following detailed description of a preferred embodiment of the invention when taken in conjunction with the appended drawings.

DESCRIPTION OF DRAWINGS

FIG. 5 is a cross-sectional view taken along line 5—5 of FIG. 3.

DETAILED DESCRIPTION OF PREFERRED EMBODIMENT

A preferred embodiment of the present invention has motor rotated mixer and extruder feed blades contained in a clear polymeric mixing bin 22. The motor 24 and transmission 26 are contained in a stepped shaped enclosure 28 which supports and cradles the bin within its step. An auger extrusion screw 30 is contained in a cylindrical housing 32 protruding into the front 33 of the bin and continuing out in front 33 of the flat front face 37 of the bin. Mixing and extrusion is determined by the direction of rotation 34 36 of the motor 24 and auger extrusion screw 30. Reverse rotation 34 backs dough out of the extruder housing and into the mixing bin, forward rotation presses dough in the extruder against and through the die 38. Specially designed dies permit repeated extrusion without intervening cleaning. A measuring cup 40 with marked transparent sides 42 and a guillotine lid 44 simplifies dry and liquid measurements. A rotating cutter arm 46 wipes the front face of the die 38 and makes cutting extruded materials a simple process.

A preferred embodiment of the present invention comprises a two piece molded polymeric stepped shaped enclosure 28 containing a reversible permanent magnet dc motor 24 whose horizontal shaft 48 is positioned pointing fore 33 to aft 31 within the enclosure 28.

The motor 24 is powered by wall power conveyed through a cord entering the rear 31 of the unit. After entering the enclosure and before flowing to the motor, the ac current coming through the cord is controlled in a conventional manner in sequence through: a single-pull-single-throw safety interlock momentary-on microswitch, a full bridge rectifier, and a double-pull-double-throw three position forward-off-reverse switch 50, all of which are conventional and only partially shown in the drawings.

On the most forward 33 end of the motor shaft 48 there is a fan mounted to, and rotated by, the motor shaft. This fan is disposed within a cylindrical fan duct 64 which is vented at its front 33 end through a segmented vent 56 in the lower portion of the step of the forward piece 66 of the enclosure 28.

Adjoining this first segmented vent 56 on its left 58 in the forward 33 most area of the lower part of the step of the forward piece 66 of the enclosure 28, and contiguous with the first segmented vent 56, is a second segmented vent 66' in communication with and alternating the direction of the fan 52 driven air flow through the first segmented vent 56.

The step shaped enclosure 28 is mostly sealed so that during embodiment operation, air is drawn into 76-74 through the second vent 66', over the motor 24 and out 71-70 through the first vent 56 during ingredient mixing; and, when the motor is reversed, air is drawn into 71 through the first vent 56, over the motor and out 76-74 through the second vent 66' during ingredient extrusion.

During both ingredient mixing and extrusion, air moved by the fan helps cool the motor. During ingredient extrusion, air exhausting 76-76 out the second vent 66' blows in a generally horizontal and downward direction helping to dry the ingredients which have been extruded onto the counter or plate surface. This is helped because exhausted 76 air has been warmed by passing over the motor. This reciprocating fan driven air movement is facilitated by a cylindrical fan duct 64 which surrounds the perimeter of the fan blade 52 and connects air entering the fan blade solely and directly with the first segmented vent 56 and prevents air exiting the fan blade from reversing direction and reentering the fan blade until it has been exhausted from the second vent 66' and performed its drying function. Having air movement created by both the first and second segmented ducts creates more air turbulence than a single air flow and thus enhances ingredient drying.

The aft plate of the motor frame is securely mounted to the forward facing flat wall of a rear facing open-box shaped molded gear housing 78 which in turn is rigidly connected to the rear piece of the enclosure 80 with four screws thus forming a full rigid covered box. The rear piece of the enclosure 80 is mounted to the front piece of the enclosure 66 with an additional four screws thus forming the stepped shaped enclosure 28 which contains the aforementioned full covered box.

Within this full covered box, the aft 31 end of the motor shaft 48 mounts a primary drive pinion gear 82 on a slip clutch formed by a ball bearing pressing against a "D" flat on the motor shaft with a set screw adjusted helical spring pressing against the ball. If too much torque is placed against the primary drive pinion gear 82, the ball bearing is forced upward by the flat on the motor shaft until it disengages the flat and allows the motor shaft to rotate within the pinion gear. This type slip clutch is known in principle and has not been illustrated in detail for simplification of illustration.

The primary drive pinion gear 82 meshes with a larger first intermediate gear which is rigidly and coaxially connected to another pinion gear which meshes with a second intermediate large gear, which in turn is rigidly and coaxially connected to another pinion gear which then meshes with a large final drive gear 84. The transmission is conventional and has not been shown in detail for simplification of illustration.

This cascading gear transmission, which is entirely disposed within the full covered box formed between the open box shaped gear housing 78 and rear piece 80 of the two piece enclosure 28, reduces the motor drive speed by about 100:1, or from a no-load motor speed of 6,000 rpm to 60 rpm.

Axle mountings for the two intermediate gears and the final drive gear front 33 to back 31 within the full covered box are provided and are horizontally disposed between, and securely connected to, the inside face of the gear housing 78 and the inside face of the rear piece 80 of the two piece enclosure. Two metal plates mounted on each end of the axles and secured by four screws each to the gear housing and rear piece of the two piece enclosure respectively, help support the axles for the first and second intermediate gears.

The transmission is similar to those well known in the art and, therefore, detailed illustration has been omitted for simplification.

A horizontally disposed mixer/extruder drive shaft 86 couples to the large final drive gear 84 though a hexagonal hole in the gear's center collaring a hexagonal portion of the shaft. This drive shaft projects directly and generally horizontally, forward 33, through a hole 88 in the forward piece 66 of the enclosure 28, and into a transparent molded polymeric mixing bin 22 which is cradled in the step of the step shaped enclosure 28. This mixing bin 22 is generally rectangular in plan view and has: an open top; generally flat right 90 and left 92 and front 94 and back 96 side walls; and a near half cylinder bottom wall 98 which is slightly inclined downward toward the front 33 of the bin 22. Protruding from the front wall 94 of this mixing bin 22, and about ⅓ the diameter of the mixing bin's cylindrical bottom wall 98, and protruding about ⅓ the mixing bin's length into the mixing bin 22 and approximately concentric with the drive shaft 86 and cylindrical bottom wall 98 of the mixing bin and raised above the cylindrical bottom wall of the mixing bin, is a cylindrical extruder housing 32.

Directly forward of the final drive gear 84 and mounted on the drive shaft 86 inside the mixing bin 22 on a cylindrical tubular shaft 100 which has a hexagonal center bore collaring and engaging a hexagonal portion of the drive shaft, is a set of radially disposed mixing and extruder feeding blades 20.

Starting from the back of the mixing bin and moving forward, there are three straight mixing blades 102, 104, 106 mounted orthogonal to the drive shaft 86 axis of rotation. These blades, when turned by the motor/transmission driven drive shaft, rotate their outer tips in close proximity to the cylindrical bottom wall 98 of the mixing bin 22. Each mixing blade 102, 104, 106 is generally flat in cross section and angled at about 45 degrees from the drive shaft 86 axis of rotation so as to propel ingredients in the mixing bin 22 forward 33 to the front of the mixing bin during ingredient extrusion. Viewed from the side, the blades 102, 104, 106 each have a narrow, high aspect ratio, trapezoidal outline.

The first mixing blade 102 is positioned in close proximity to the flat rear wall 96 of the mixing bin. The next 104 is positioned about ⅓ the length of the cylindrical tubular shaft 100 forward of the first 102 and at 90 degrees clockwise rotation 36 from it when viewed from the front of the drive shaft, and the third 106 is positioned at the forward 33 end the tubular shaft 100, just aft of the back of the cylindrical extruder housing 32, and at 90 degrees clockwise rotation from the second mixing blade 104.

These sequenced 90 degree mixing blade placements help move ingredients to the mixing bin 22 to the front 33 part of the mixing bin during ingredient extrusion.

Forward of these three mixing blades 102 104 106 and mounted on the same tubular shaft 100, are a lower extruder feed blade 108 and an upper extruder feed blade 110. The upper extruder feed blade 110 is supported by an arm 112 which is also positioned near the front of the tubular shaft and at 90 degrees clockwise rotation from the third mixing blade 106. This arm 112 is radially disposed and inclined forward about 30 degrees off vertical toward the front 33 of the mixing bin. This inclined arm 112 projects the upper extruder feed blade 110 over the cylindrical rear portion of the extruder housing 32 which protrudes back into the forward portion of the mixing bin coaxial with the drive shaft 86 and tubular shaft 100.

The upper extruder feed blade 110 is a narrow flat paddle inclined 5 degrees inward off radial disposition. This blade's outer edge, when rotated by the drive shaft 86, comes in close proximity to the cylindrical lower mixing bin wall 98 and its inner edge rotates at a distance substantially away from the rear projecting cylindrical extruder housing 32. The forward facing edge of the upper extruder feed blade 110 is disposed in close proximity to the generally flat forward inside wall 94 of the mixing bin.

The lower extruder feed blade 108 is a straight rod-like projection which is mounted parallel with the drive shaft 86 on another 30 degree off vertical forward inclined radial arm 114 which is positioned on the cylindrical tubular shaft 100 180 degrees opposite the arm 112 holding the upper extruder feed blade 110. The lower extruder feed blade 108 rotates parallel to and in close proximity to the cylindrical outer wall of the extruder housing 32 and at a distance substantially away from the mixing bin's lower cylindrical wall 98. The forward 33 facing tip of the lower extruder feed blade 108 is disposed in close proximity to the generally flat forward inside wall 94 of the mixing bin.

Disposed on the inside of the mixing bin's generally smooth interior cylindrically shaped lower wall 98 are a series of discrete, separated, narrow, shallow, sharp, upward facing step shaped protrusions 116 which on their lower sides incline and blend into the mixing bin's interior wall thus forming projections with acute triangular vertical cross sections and rectangular perimeter outlines when viewed in plan.

The upper portion the mixing bin 22 is generally rectangular in horizontal cross section, with generally vertical walls 90, 92, 94, 96 capped by a detachable, hinged, molded, clear polymeric lid 118. This lid on the portion of its upper surface directly above the mixing bin is unequally bisected parallel with the drive shaft's 86 axis of rotation into left 120 and right 122 indented areas.

The larger right-hand indented area 122 is surrounded by low vertical walls and has an interior inclined planar surface 124 sloping about 15 degrees off horizontal down to the right with this planar surface penetrated for about half its width at its right-hand side by an open segmented grate 126. This inclined planar surface and open segmented grate allow flour and/or other liquid or solid ingredients to be poured into the mixing bin without opening the mixing bin lid 118 and without stopping the machine and without allowing fingers or hands to enter the mixing bin.

The smaller left-hand indented area 120 has a "U" shaped trough penetrated at its central base by a narrow slot 128 running fore 33 to aft 31 for most of the trough's length. The trough and slot 128 allow liquid ingredients to be poured into the mixing bin through the mixing bin lid.

Across most of the rear of the lid projects a rigid flat lever 130 which terminates along the full length of its back edge in an upward facing hook 132 which engages a reciprocal downward facing catch 134 in the top of the step shaped enclosure 28 when the lid is closed on the mixing bin 22. This hook engagement securely couples the lid 118 and mixing bin 22 to the step shaped enclosure 28 when the lid is closed on the mixing bin.

Also projecting off the rear of the lid, and positioned on both sides of the rigid flat lever, are two short vertical ribs. Both ribs project back through holes in the back flat wall of the mixing bin when the lid is closed on the mixing bin, thus helping to hold the lid onto the mixing bin. The right-hand rib is longer than the left, and when the lid is closed on the mixing bin, the right-hand rib pivots through a hole in the stepped enclosure and contacts the safety interlock momentary-on microswitch, thus turning the motor off when the lid is opened.

The front of the lid has a molded on latch comprised of a wide horizontal flexible flat rib connecting the main front portion of the lid to the middle of a wide vertical rigid flat rib which has left and right rear facing projections 138 on the vertical rib's outer lower front left and right edges which go over and in front of and engage forward 33 facing undercuts 140 disposed on the upper front edge of the mixing bin's generally flat outer front wall 94 when the lid 118 is closed on the mixing bin. This latch is opened by moving the upper edge of the wide vertical flat rib backwards 31 with finger pressure which in turn teeter-totters the latch projections 138 on the fulcrum of the flexible flat rib out of engagement with the mixing bin's upper front edge undercuts 140. The natural resilience of the polymeric flexible flat rib acts as a spring to reengage this latch when the lid is closed back on the mixing bin.

The mixing bin on both the upper left and upper right sides of its flat rear wall has two rear facing cylindrical pins which engage holes in the stepped shaped enclosure 28. Additionally the enclosure has a forward facing shallow cylindrical projection 146 surrounding the drive shaft 86 entry into the mixing bin. This shallow projection 146 engages a hole penetrating the flat rear wall of the mixing bin. For further rigid engagement of the mixing bin with the stepped shaped enclosure there is a vertical rib 148 projecting from the lower front section of the mixing bin. This rib is penetrated by two holes which engage pins 144 molded into the stepped shaped enclosure 28.

The front most section of the drive shaft 86 has a helical auger extruder screw 30 integrally molded with the shaft. This screw 30 is disposed with a generally close fit between its outer perimeter and the interior of the cylindrical molded polymeric extruder housing 32. The extruder housing in turn projects partially back into the mixing bin coaxial with the drive shaft 86, and partially forward out in front of the mixing bin 22.

The rear of the extruder housing 32 which is disposed within the bin 22 is capped at its back with an integral vertical wall 150 having a central hole through which the drive shaft 86 passes. In order to form a thrust bearing surface, where the rear of the extruder screw contacts this rear vertical extruded housing wall, there is a metal washer 152 insert molded to the extruder housing's rear vertical wall 150 and a plastic bearing washer 154 attached to the back of the extruder screw 30.

Figure 6:
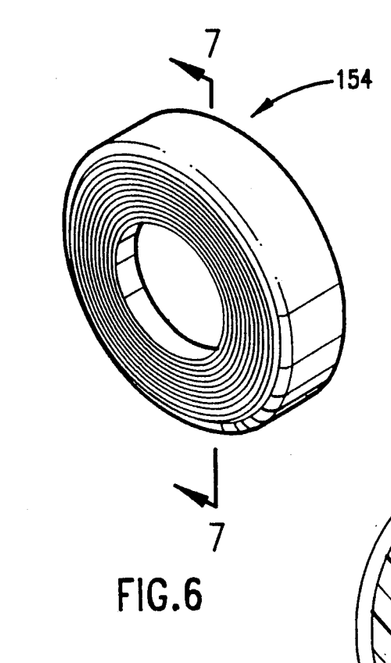
FIG. 6 is a view in perspective of a novel plastic bearing washer.
Figure 7:
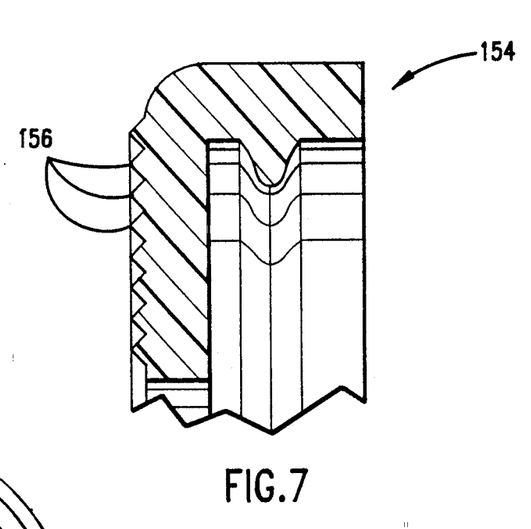
FIG. 7 is a sectional view of the washer shown in FIG. 6.
Figure 8:
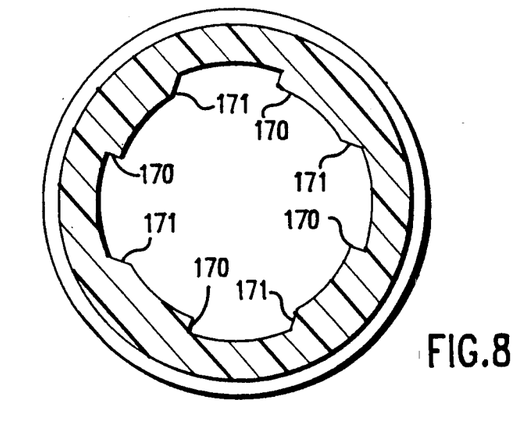
FIG. 8 is a sectional view through the extruder taken along line 8—8 of FIG. 3.

This plastic bearing washer 154 has densely packed bulls-eye-like concentric grooves 156 in its surface which contacts the metal washer 152. These grooves 156 provide clearance for dry contents which might leak into the bearing area and get trapped between the two bearing surfaces 152 154. The grooves 156 substantially reduce both bearing wear and bearing noise.

The portion of the cylindrical extruder housing 32 which is disposed within the mixing bin 22 is penetrated by an upper extruder feed hole 158 and a lower extruder housing clearing hole 160. The larger upper extruder feed hole 158 is generally rectangular in plan view and penetrates the upper cylindrical wall of the extruder housing 32 symmetrically through about 90 degrees of arc. The extruder feed hole 158 is open for most of the length the extruder housing 32 is within the mixing bin. During extrusion, ingredients to be extruded may enter the interior of the extrusion housing 32 through this upper extruder feed hole 158.

The smaller lower extruder housing clearing hole 160 is also rectangular and is open through about 30 degrees of extruder housing wall arc in the lower most section of the extruder housing 32. The lower clearing hole 160 runs only about ⅓ of the length the extruder housing is within the mixing bin, with the clearing hole's 160 back edge directly below the back edge of the helical extruder screw 30 and forward of the bearing 154 on the back of the extruder screw 30.

During mixing, the extruder screw 30 moves materials to the rear 31 of the extruder housing 32 where they are cleared out of the extruder housing through the lower clearing hole 160. This helps prevent the collection of dry flour in the extruder housing during mixing.

The extruder housing 32 is integrally molded into a large vertical flat circular disc 162 which rotationally mounts 36 and dismounts 38 to the generally flat mixing bin front wall 94 through three symmetrically space bayonet type latches 164 on its perimeter. This flat disc 162 and the extruder housing 32 it supports form most of the entire front 33 interior wall of the mixing bin.

On the inside wall of this disc 162 facing into the mixing bin 22, there is a rod like clearing projection 166 pointing directly back toward the rear 31 of the embodiment. The left-hand leading edge 34 of this cleaning projection 166 is disposed almost over, and a moderate distance from, the right-hand 58 edge of the extruder housing feeding hole 158.

The projection's 166 position is such that when the drive shaft 86 is rotated 34, 36, the lower edge of the upper extruder feed blade 110 passes above and in close proximity to the upper edge of the clearing projection 166, while the upper edge of the lower extruder feed blade 108 passes below and in close proximity to the lower edge of the clearing projection 166. During such rotation the rear facing tip of the clearing projection 166 comes in close proximity, but does not touch, the arms 112 114 holding the upper 110 and lower 108 extruder feed blades.

During both mixing and extrusion, ingredients in the bin 22 are mixed by the mixing and extrusion blades 20 rotationally 34, 36 passing through the ingredients and by the ingredients being pressed and shredded by the mixing and extrusion blades 20 against the mixing bin's side walls and stepped shaped protrusions 116 thereon.

During extrusion, ingredients in the mixing bin are moved toward the front 33 of the mixing bin by both the mounting angle of the flat mixing blades 102, 104, 106 and by the mixing blades order of progression along the cylindrical tubular shaft 100.

At the front end 33 of the mixing bin 22 the ingredients are lifted by the upper extruder feed blade 110 from the cylindrical bottom 98 of the mixing bin to above the extruder feed hole 158. Some ingredients may here naturally drop off the upper extruder feed blade into the extruder feed hole. Yet other ingredients may stick to the extruder feed blade.

As the upper extruder feed blade 110 continues around 36, it passes parallel to and in close proximity to the rod-like clearing projection 166. As it passes, excess ingredients are scraped off the extruder feed blade 110 by the rod-like clearing projection 166 and then these scraped ingredients may fall into the extruder feed hole, or fall back into the mixing bin, or they stick to the rod-like clearing projection. As the extruder feed blade continues yet further, it passes the bottom of the mixing bin 98 where it scrapes off ingredients stuck to it and picks up more ingredients and repeats the cycle. The step shaped protrusions 116 on the cylindrical bottom wall 98 of the mixing bin help in this by tearing and mixing the dough passing on the upper extruder feed blade.

Ingredients which get stuck to the rod-like projection 166, as well as ingredients which become bridged over the extruder feed hole 158, may be cleared by rotation 36 of the lower extruder feed blade 108. As the lower extruder feed blade rotates it passes just above the extruder feed hole 158 and just below the rod-like projection 166 and tends to clear them both and drop ingredients into the extruder feed hole or occasionally back into the mixing bin.

During ingredient mixing, ingredients may enter the extruder feed hole 158. These ingredients may be cleared from inside the extruder housing by a combination of the rotation of the extruder screw 30 moving ingredients to the back 31 of the extruder housing 32, and the extruder clearing hole 160 being at the lower back of the extruder housing allowing the ingredients to exit the interior of the extruder housing.

During ingredient extrusion, ingredients enter the extruder feed hole 158 and are propelled toward the front 33 of the extruder housing 32 by the rotating extruder screw where they are then compacted against the extrusion die 38 and pressured through the die's openings 168. Four long shallow steps 170 in the front 33 half of the interior wall of the extruder housing 32, and running parallel with the mixer/extruder drive shaft 86, help the extruder screw 30 build ingredient pressure against the extruder die 38. These steps 170 are radially disposed on the sides facing clockwise 36 extruder screw 30 rotation and are ramped at 45 degrees to radial on the side facing counterclockwise 34 extruder screw 30 rotation. This helps prevent pressure on the extruder screw during mixing due to dry flour between pressing against the step. It also provides an additional measure of safety if someone should accidentally leave off the extrusion die and put their finger into the extruder screw during mixing.

The cylindrical interior of the rear half of the extruder housing is smaller in diameter than the forward half and smooth with no steps. This also helps reduce pressure on the extruder screw during mixing. Also, the thread on the rear of the extruder screw does not extend all the way to the back of the extruder housing. This is yet another way of reducing pressure on the extruder screw during mixing.

Capping the front of the extruder housing 32 is a threaded die nut 172 capturing a circular flat disk extrusion die 38. A plurality of female buttress threads 174 on the inside of the die nut hold the die nut in engagement with male buttress threads on the outside of the front of the extruder housing. Castellated indents 176 on the forward perimeter of the die nut provide engagement for a wrench if the die nut becomes stuck or is tightened too tight onto the extruder housing. Motor reversal may also be used to lower pressure on the die nut and make it easier to remove.

An inward projecting lip on the front face of the die nut engages and captures the outer perimeter of each circular extrusion die.

A cylindrical tube 178 is integrally coupled parallel with the drive shaft 86 axis on the right 60 side of the die nut 172. An "L" shaped molded cutter blade 46 easily snap fits into and out of and rotates 34 36 in the hole in the center of this cylindrical tube 178. This blade 46 has an elongated flat surface which parallels the front surfaces of the extrusion dies 38 when the cutters and dies are both mounted to the embodiment. This blade 46 has sharp edges on both sides, and has a small finger handle 182 which permits the blade to be rotated 34 36 by hand across the front 33 face of each extrusion die 38 contacting and scraping the die's front surface across the blade's length thus cutting material extruding through the die holes 168. A second longer tube 180 is disposed above and parallel to the first tube 178 and permits use of the cutter 46 with deeper (thicker) dies such as those used to make macaroni. This cutter blade 46 is free to rotate a full 360 degrees which makes it easy to cycle from cut to cut.

Each extrusion die 38 is penetrated front to back by one or more holes 168 shaped to produce various cross sections of extruded material. As an example, a spaghetti extrusion die might have 30 -⅛ inch diameter holes spaced on about ¼ inch centers.

Some or all of the extrusion dies 38 may have holes 168 with cross sections comprising a forward 33 segment having parallel walls 184 for at least 0.010 of an inch and a widely taper rear segment 186 with walls angling at least 20 degrees off the hole's center axis. This construction differs from conventional die configurations and promotes both easy cleaning due to the high rear hole taper, and intermittent extrusions without intervening cleanups because material drying in the front of the die may be easily extruded through the die due to the parallel wall construction in the forward die segment. A variant of this has the forward die segment with a forward facing hole taper instead of parallel walls.

The dies are subjected to tremendous pressure during extrusion. Interlocking annular projections on the forward outer perimeter of each die 188 and on the rear inner perimeter of the die nut center hole 190 engage each other to lock the die in place during extrusion.

During extrusion pressure on the die 38 from material to be extruded pressing against the die 38 may make the die nut 172 difficult to unscrew. The cutter tubes and their support help give leverage to unscrew the die nut. In addition, a wrench is provided with the embodiment to facilitate removal of the die nut 172. Also, the embodiment may reverse its motor rotation direction to the mix mode and thus lower the pressure on the die nut by reversing the direction of rotation 34 of the extruder screw. This reversing action makes removal of the die nut much easier.

Figure 9:
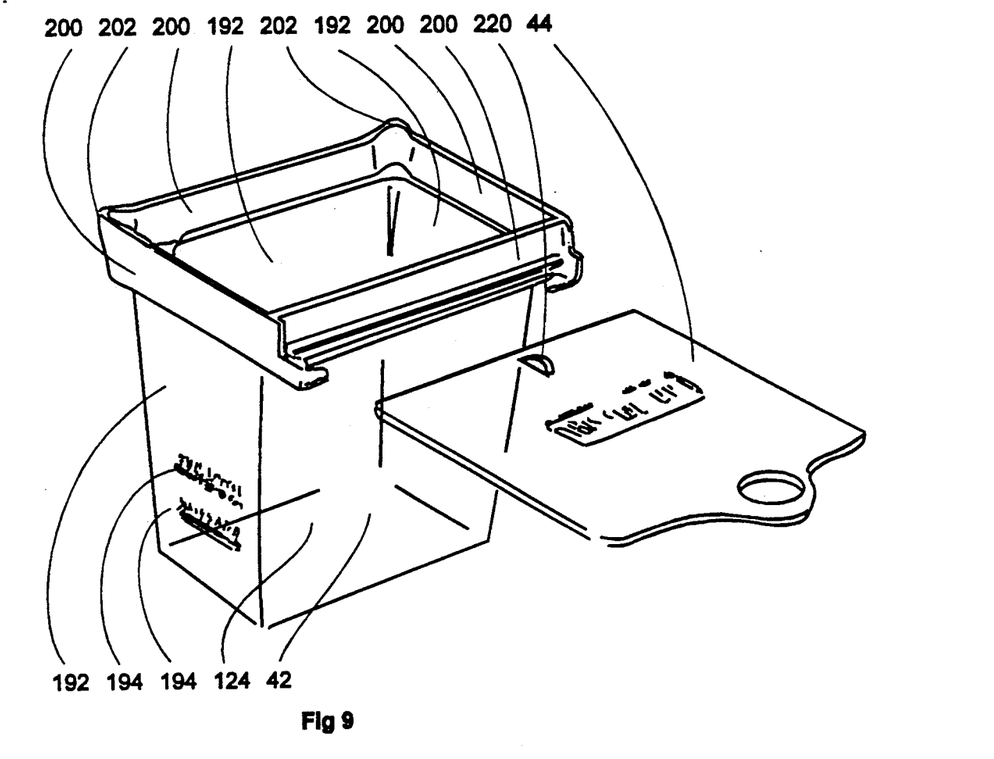
FIG. 9 is a perspective view of a novel measuring cup for use with the novel pasta maker.

To measure powder, liquid and other materials being placed in the mixing bin, a measuring cup 40 is provided. This cup is rectangular in plan view with transparent generally vertical side walls 192 which are marked 194 with horizontal lines and wording for measurement of ingredients, and a guillotine lid 44 which slides horizontally in from the side to both automatically and accurately level measured materials and to make possible dumping materials into the mixing bin either through the segmented grate 126 in the right-hand side of the lid 118 or directly into the uncovered mixing bin. The cup has a low wall 200 above the lid which prevents the excess flour or other measured materials from dumping off the cup when the lid is closed.

To dump materials measured in the measuring cup 40 directly into the mixing bin with the mixing bin lid closed, the materials are first poured into the measuring cup 40 and the measuring cup's lid 40 is slid 196 to its closed position and the excess materials are poured back into their storage container. The closed measuring cup is then inverted and placed onto the right side of the mixing bin lid with the handle on the measuring cup lid pointing to the left side of the mixing bin lid. The lid of the measuring cup is then slid open 198 and the measuring cup shaken left 58 and right 60, and/or fore 33 to aft 31 to help sift the materials through the holes in the grate 126 on the right side of the mixing bin lid. This shaking action is possible because the inclined planar surface 124 on the mixing bin lid's right side is larger than the top of the measuring cup and thus allows room for the cup 40 to be shaken both right to left and fore to aft. Some materials, such as sugar or durum flour may not require the sifting action.

The measuring cup 40 also has pouring spouts 202 formed in two forward upper corners by the thinned side walls. These prevent dripping and help in easily pouring liquid into the machine either with the lid open or closed. The measuring cup's lid had a stop 220 which prevents the lid from being accidentally removed from the cup but allows the cup to be fully opened with the lid still mounted to the cup. The lid 44 may be disengaged from the cup by a firm pull.

Figure 1:
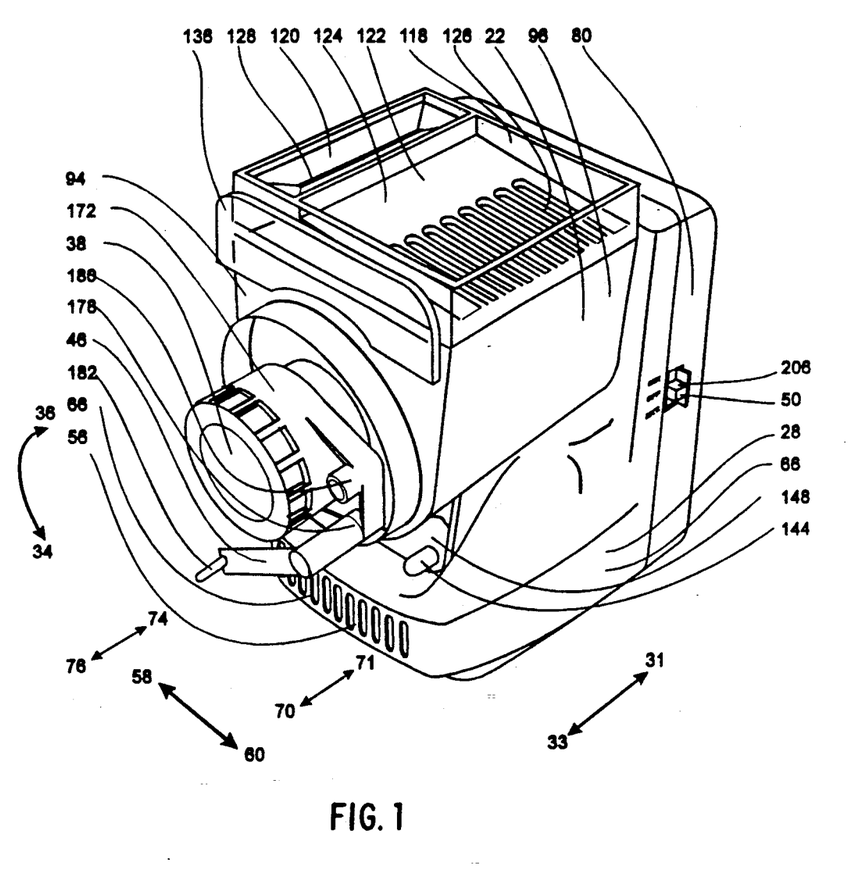
FIG. 1 is a perspective view of the novel pasta maker constructed according to the present invention.
Figure 1A:
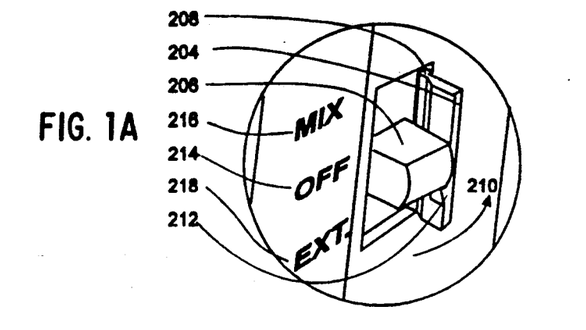
FIG. 1a is a detail showing the control switch for the pasta maker.
Figure 2:
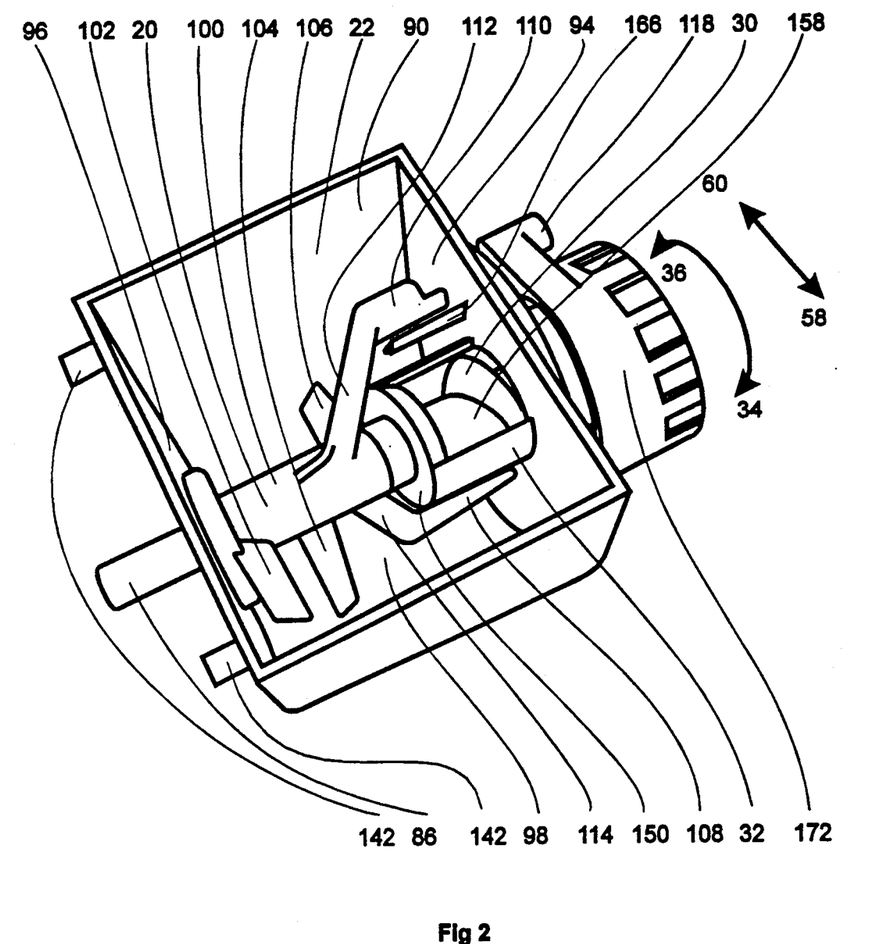
FIG. 2 is a top view of the mixing components.
Figure 3:
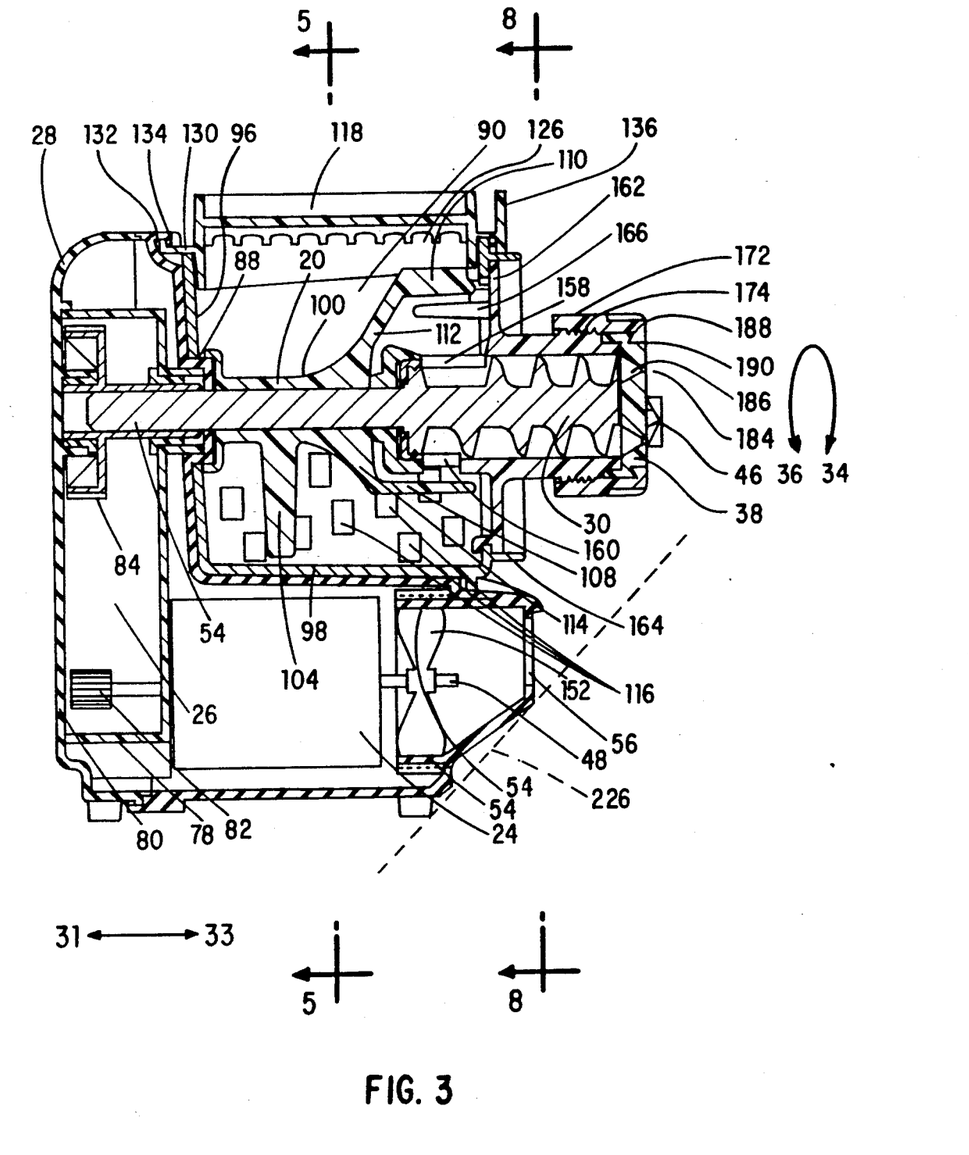
FIG. 3 is a longitudinal vertical section through the center of the pasta maker taken along line 3—3 of FIG. 4.
Figure 4:
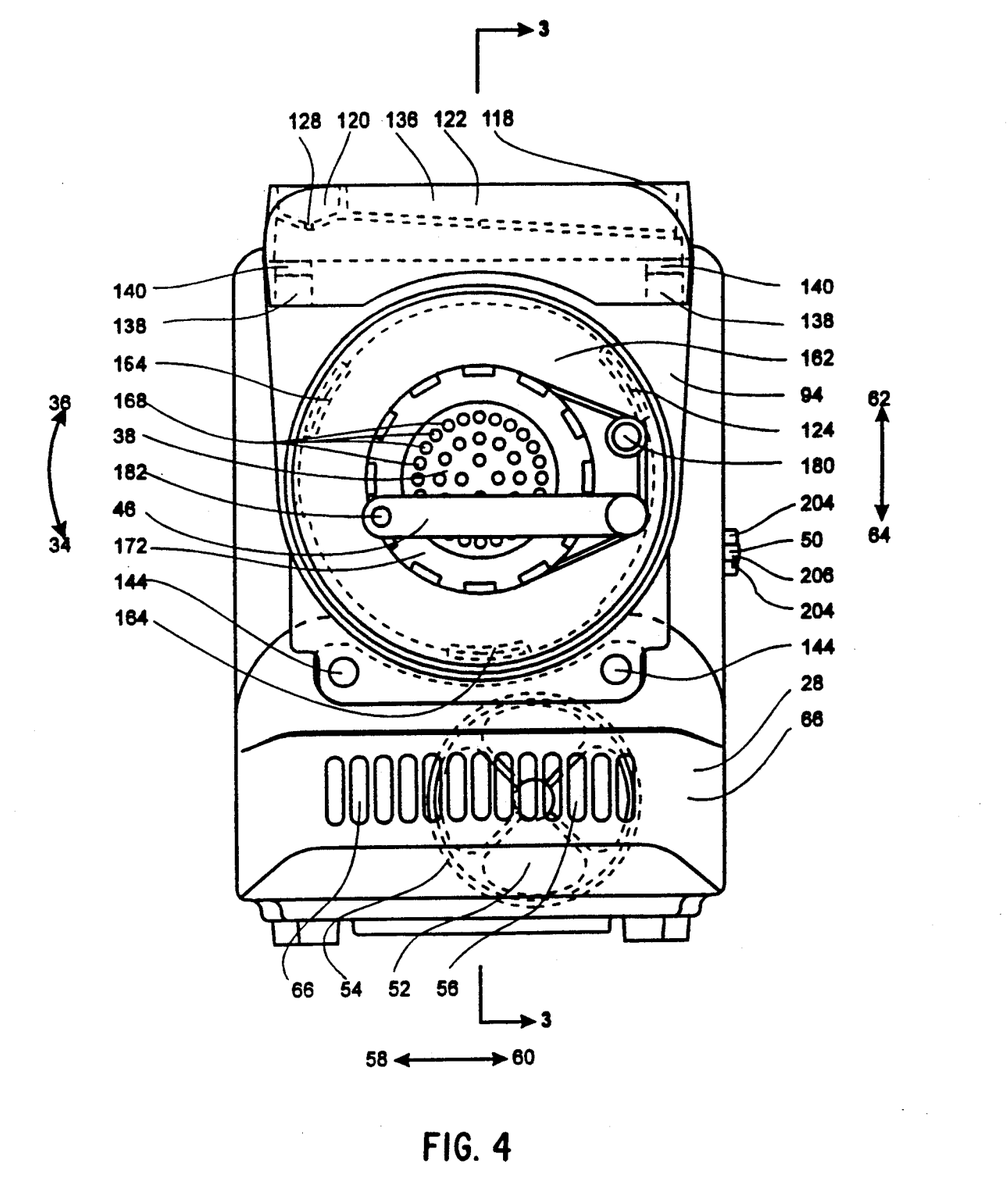
FIG. 4 is a front elevation of the pasta maker.

The double-pull-double-throw three position forward-off-reverse switch 50 has a safety push button 204. The switch is comprised of a three position, center off slide switch with a flexing molded rib 204 integral to the rear piece of the two piece enclosure and disposed orthogonal to the wall from which it projects and directly beside the switch's slide lever 206.

The flexing portion 208 of the rib 204 is simply a place where the material forming the rib is thinned. It is located at the rib's base parallel with the wall from which the rib projects and allows the top portion of the rib to flex away 210 from the switch slide while the bottom of the rib closest to the wall from which the rib projects remains next to the switch slide. The flexing molded rib has a tapered catch 212 close to its top which is positioned to prevent the switch from being moved from its off position to its extrude position without the rib being deflected 210 by finger pressure to one side away from the switch slide 206. This tapered catch 212, however, because of its position and taper in direction of the switch slide travel, does not interfere with the switch being moved from its off 214 to its mix 216 position or vise versa or from its extrude 218 to its off 214 position.

An alternative to this three position switch is an electronic control system which may switch the unit to mix and then to extrude and then off at either preset or user set intervals. Such electronic control systems are today used in such appliances as bread and dough makers.

In operation this preferred embodiment is easy to use. As an example, to make spaghetti the following might occur. Flour would be poured into the measuring cup 40 until the cup was slightly over full. The cup would then be tapped on the counter top to lightly pack it. Flour over the measured amount would be removed from the cup by sliding 196 the cup's flat lid 44 closed, thus closing the cup and leaving excess flour on top of the cup's lid surrounded by the low walls 200 projecting above the lid 44 of the measuring cup. The excess flour would then be poured back into its storage container by inverting the cup over the container with the cup's lid 44 still closed.

The flour remaining in the cup would then be dumped into the bin either by opening both the cup's and the bin's lids and pouring the cup's contents into the bin, or by inverting the cup onto the right side 122 of the closed bin lid with the cup's lid handle pointing left 58, opening the cup by sliding 198 its flat lid sideways, and repeatedly sliding the cup across the lid left to right and/or fore to aft over the segmented grate 126 in the right side of the lid. This repeated movement sifts the flour through the segmented grate into the mixing bin.

Generally, before liquid is added to the mixing bin, the embodiment's motor is turned on to the mix direction by sliding the double-pull-double-throw three position forward-off-reverse switch 50 up to the mix position 216. Water, eggs and possibly other liquid ingredients such as vegetable juices or spices are then poured into the measuring cup to the desired measuring height marked on the transparent side walls of the cup. The contents of the measuring cup are then poured into the mixing bin either through the segmented grate in the right-hand side of the mixing bin lid 122 or through the slot 128 in the trough on the left-hand side of the mixing bin lid.

After 30 seconds to 5 minutes the ingredients of the mixing bin may be fully mixed. This is generally faster than most pasta makers because of the unique mixing blade configuration and because of the shallow steps 116 on the interior of the bottom wall of the mixing bin which help tear and mix the ingredients.

By using individually segmented steps 116 instead of a connected form such as a single straight line step, these shallow steps 116 help prevent motor surging while the ingredients are being mixed and extruded. Ingredients hit each step one at a time instead of colliding all at once or in a regimented order with an integrated form such as a step running the length of the mixing bin.

The configuration of the mixing and extruder feeding blades also helps prevent motor surging. When viewed from the front, the three mixing blades 102 104 106 and the upper extruder feeding blade 110 are disposed radially from their drive shaft 86 at 90 degrees from one another. No two long blades (this excludes only the lower extruder feed blade) are located in the same 90 degree quadrant. This means that at any one instant, a maximum of only one of these blades is entering or leaving the ingredients being mixed, thus significantly reducing uneven motor loads caused by unsymetrical ingredient contact.

During mixing and extrusion it may be necessary to add either dry or liquid ingredients to the mixing bin to make a correct mixture. The segmented grate 126 on the right-hand side of the mixing bin lid and the slot 128 in the trough on the left-hand side of the mixing bin lid allows such ingredients to be added without opening the mixing bin lid and thus without interrupting the mixing.

The transparent mixing bin and mixing bin lid, and stepped shaped enclosure are also very important in allowing the user to view the ingredients being mixed to determine that the mixture is correct, or what is needed to make it correct.

After the ingredients are mixed, the three position forward-off-reverse switch 50 is then switched down to its extrude position 218 by pressing down on the switch lever with a finger and simultaneously with the same finger pressing against the adjacent flexing rib 204 to release the safety catch 212 and allow the switch lever to move into the extrude position 218.

During extrusion, ingredients are: further mixed; moved to the front of the mixing bin by the mixing blade 102 104 106 mounting angles and placement and by the downward sloping cylindrical lower wall 98 of the mixing bin; lifted and moved into the extruder feed hole 158 in the top of the rear half of the extruder housing by the upper 110 and lower 114 extruder feed blades, and moved and pressured through the extrusion die 38 by the auger extrusion screw 30.

After the ingredient mix passes through the die it can be cut by repeatedly rotating the cutter blade 46 in front of the die 38. After all the ingredients are extruded and the mixing bin is empty, the embodiment is turned off by pushing three position forward-off-reverse switch 50 up to its off position 214.

In some cases it may be advantageous to tip the embodiment forward so it rests on its forward two support feet 222 and the lower forward lip 224 of the front piece of the two piece step shaped enclosure. The embodiment is balanced on the table or counter top 226 to rest stabile in this forward tipped position and it, through its design form, provides a solid support base in this tipped position.

This forward tip position allows the embodiment to extrude pasta and other shapes which don't extrude easily through a vertical extrusion die plate. These shapes include rotini and fusili as well as thick forms such as cookies and thick pie crusts among others. This forward tip position may also help in fully cleaning the contents from the mixing bin by moving bin contents, and particularly wet or sticky contents, to the front of the mixing bin where they can be picked up by the extruder feed blades. The embodiment may also be tipped over the edge of a counter or table to help in either extruding or cleaning.

Additional pasta can be made without intervening cleanup by adding more flour and liquid to the mixing bin either immediately or up to one or two hours later, and repeating the above process. This repeated mixing is possible because pasta mix which may dry in the front of the die holes may be easily extruded through the forward portion of the die holes which have either no taper or are outwardly tapered.

Also, the slot 128 in the left-hand side of the mixing bin lid and the segmented grate 126 in the right-hand side of the mixing bin lid allows ingredients to be added to the mixing bin without even opening its lid or turning off the embodiment.

Cleaning the mixing bin and extruder is done by disassembling the embodiment. To do this the lid 118 is opened and then lifted out of engagement with the mixing bin by rotating the lid to its vertical position where it is out of engagement with step shaped enclosure and lifting it straight up away from the enclosure. The mixing bin is then pulled forward and uncoupled from the stepped enclosure by pulling on the rib 148 near the bottom from the mixing bin and simultaneously pushing on the pins 144 that pass through the rib.

The extruder housing 32 and integral disc 162 is then disengaged from the mixing bin by rotating it counterclockwise 34, thus uncoupling its bayonet latches 164, and pulling the housing away from the mixing bin. The mixing blades 20 are then slid backward off the drive shaft 86. After the die nut 172 is unscrewed 34 and the die 38 is pulled off, the extruder screw 30 and integral drive shaft 86 is pulled forward out of the extruder housing 32. This renders all cleanable parts disassembled and ready for cleaning.

Reassembling the unit is done by reversing the above process.

Many foods can be made with the embodiment described including: all kinds of pastas such as rotini, macaroni and spaghetti; cookies such as peanut butter and gingerbread cookies; pastries such as pie crusts; baked goods such as brownies, bagels and biscuits; and hors d'oeuvres such as chicken or beef meat balls and cheese dips. Most of these are made with recipes well known in the art with slight modification to accommodate rotary mixing and extrusion.

The structure of the embodiment is unique. A high degree of stiffness is required to insure integrity under heavy loads caused by mixing and extrusion. To achieve this, the embodiment comprises two enclosed box sections. The first is formed by the two halves 66 80 of the stepped shaped enclosure 28 joining. The second enclosed box section is formed between the rear piece 80 of the stepped shaped enclosure and the open box shaped gear housing 78. Both these formations are stress skin structures which give excellent stiffness and structure to the embodiment.

Flour, liquid and other contaminants can clog gears and shorten component life. The embodiment has its gears disposed within a sealed compartment formed between the rear piece of the stepped shaped enclosure 80 and the open box shaped gear housing 78. This eliminates contaminate exposure to the gears. The motor 24 and switches are enclosed within the stepped shaped enclosure 28. Openings into this area are limited to vertical surfaces to minimize contaminate entry.

The embodiment may be made at any convenient scale. As an example, the mixing bin may be approximately 6 inches wide, 6 inches deep and 6 inches high. The stepped shaped enclosure may be of any size to fit an appropriate motor and transmission.

Also the embodiment may be made of any of a variety of materials such as: polycarbonate for the extruder housing, lid and mixing bin; ABS for the stepped shaped enclosure, gear housing and die nut; and acetal resin for the mixing bin, dies, extruder screw and mixing blades.

Various changes and modifications to the preferred embodiments will be apparent to those skilled in the art. Such changes and modifications may include, but are not limited to: using more or fewer mixing blades or changing their shape or layout; reversing the fan air flow; eliminating the trough on the left-hand side of the mixing bin lid; having the measuring cup lid rotatably slide into place; having more or fewer than two blades to feed the extruder; changing the shape of the mixing bin or two piece enclosure, or measuring cup; using a different transmission such as a belt drive; integrating the mixing/extruder blades with the extruder screw; locating the motor in a different position such as with its shaft disposed right to left instead of fore to aft; channeling the air flow different such as taking air from below the embodiment and blowing at the ingredients emerging from the extrusion die from an enclosure extended to one or both sides of the die; etc.

Such changes and modifications can be made without departing from the spirit and scope of the invention. Accordingly it is intended that all such changes and modifications be covered by the appended claims and equivalents.

We claim:

1. Apparatus for mixing and extruding dough comprising a) a first stepped L-shaped housing having a rear vertical portion and a forward horizontal portion having side-by-side spaces with a grill defined in its lower forward face extending across the side-by-side spaces;

b) a reversible motor mounted in one of the spaces, a fan connected to be driven by the motor for moving air through separate portions of the grill in opposite directions of flow;

c) a transmission located in the rear vertical portion connecting an output of the motor with a horizontal connection point in the rear vertical portion spaced above the forward horizontal portion;

d) a mixing bin mounted on the forward horizontal portion and engaged with the rear vertical portion;

e) an extrusion chamber extending horizontally mounted in the mixing bin partially contained in the mixing bin and partially protruding out the front thereof; the portion of the extrusion chamber contained within the mixing bin having a top opening and bottom opening diametrically spaced, the portion of the extrusion chamber projecting out of the front having an open end, an extrusion die mounted on the open end;

f) a mixing-extrusion shaft horizontally mounted in said mixing bin having one end drivingly connected with the transmission at the horizontal connection point and having its other end received in the extrusion chamber and formed as an extrusion auger for extruding material out the die for one direction of rotation of the shaft and moving material into the mixing bin via the bottom opening for the other direction of rotation of the shaft; and g) mixing and directing blades spatially mounted on the mixing-extrusion shaft portion contained with the mixing bin for mixing material in the mixing bin and directing same into the extrusion chamber via the top opening.

2. Apparatus according to claim 1 wherein the mixing bin has a cylindrical bottom and ramp like projections protrude from the bottom inner surface of the mixing bin.

3. Apparatus according to claim 1 wherein the mixing bin includes a top hinged lid whose upper surface is divided into two areas, one of which has a slanted surface penetrated by an array of slots.

4. Apparatus according to claim 1 wherein a three position motor control switch is provided.

5. Apparatus according to claim 1 wherein a cutter blade is mounted for pivotal movement such that the cutter blade sweeps the exterior face of the extrusion die.

* * * * *